(12) United States Patent
Schroeppel et al.

(10) Patent No.: US 7,870,803 B2
(45) Date of Patent: Jan. 18, 2011

(54) BALL SCREW AND METHOD FOR DISPLACING A THREADED SPINDLE IN A BALL SCREW

(75) Inventors: Winfried Schroeppel, Eningen (DE); Timo Haass, Buettelborn (DE)

(73) Assignee: Danaher Linear GmbH, Wolfschlugen (DE)

( * ) Notice: Subject to any disclaimer, the term of this patent is extended or adjusted under 35 U.S.C. 154(b) by 0 days.

(21) Appl. No.: 12/012,277

(22) Filed: Feb. 1, 2008

(65) Prior Publication Data

US 2008/0282825 A1 Nov. 20, 2008

Related U.S. Application Data

(63) Continuation of application No. PCT/EP2006/007732, filed on Aug. 4, 2006.

(30) Foreign Application Priority Data

Aug. 19, 2005 (DE) .................. 10 2005 040 204

(51) Int. Cl.
*F16H 25/22* (2006.01)
(52) U.S. Cl. ..................... 74/89.35; 74/89.34
(58) Field of Classification Search ............... 74/89.27, 74/89.34, 89.35; 310/15, 17, 20
See application file for complete search history.

(56) References Cited

U.S. PATENT DOCUMENTS

| | | | | |
|---|---|---|---|---|
| 2,946,235 A | * | 7/1960 | Musser | 74/89.39 |
| 3,404,580 A | * | 10/1968 | Valenti | 74/89.35 |
| 3,422,696 A | | 1/1969 | Valenti | 74/424.8 |
| 4,590,816 A | * | 5/1986 | Weyer | 74/89.35 |
| 4,818,175 A | * | 4/1989 | Kimura | 414/730 |
| 5,094,118 A | * | 3/1992 | Morita | 74/89.31 |
| 5,355,743 A | * | 10/1994 | Tesar | 74/490.03 |
| 5,554,899 A | * | 9/1996 | Teramachi | 310/80 |
| 5,899,114 A | | 5/1999 | Dolata et al. | 74/424.8 |
| 5,994,806 A | * | 11/1999 | Aoki et al. | 310/80 |

FOREIGN PATENT DOCUMENTS

| | | |
|---|---|---|
| DE | 197 05 106 A1 | 8/1998 |
| EP | 0 151 788 A1 | 8/1985 |
| EP | 1 350 988 A1 | 10/2003 |
| GB | 2 272 205 A | 5/1994 |
| WO | WO 98/36186 | 8/1998 |

* cited by examiner

*Primary Examiner*—Richard W Ridley
*Assistant Examiner*—Terence Boes

(57) ABSTRACT

A ball screw comprising a threaded nut with thread channels for rolling bodies, a threaded spindle with thread channels for rolling bodies, and an intermediate bush, which is arranged between the threaded nut and the threaded spindle, wherein the intermediate bush has thread channels, which face the threaded nut and are adapted to the thread channels of the threaded nut, and rolling bodies are guided in these thread channels, and wherein the intermediate bush has thread channels, which face the threaded spindle and are adapted to its thread channels, and rolling bodies are guided in these thread channels, is proposed, wherein a first threaded arrangement, which is formed by means of the thread channels of the threaded nut and the intermediate bush facing one another, and a second threaded arrangement, which is formed by means of the thread channels of the intermediate bush and the threaded spindle facing one another, operate in opposite directions.

29 Claims, 3 Drawing Sheets

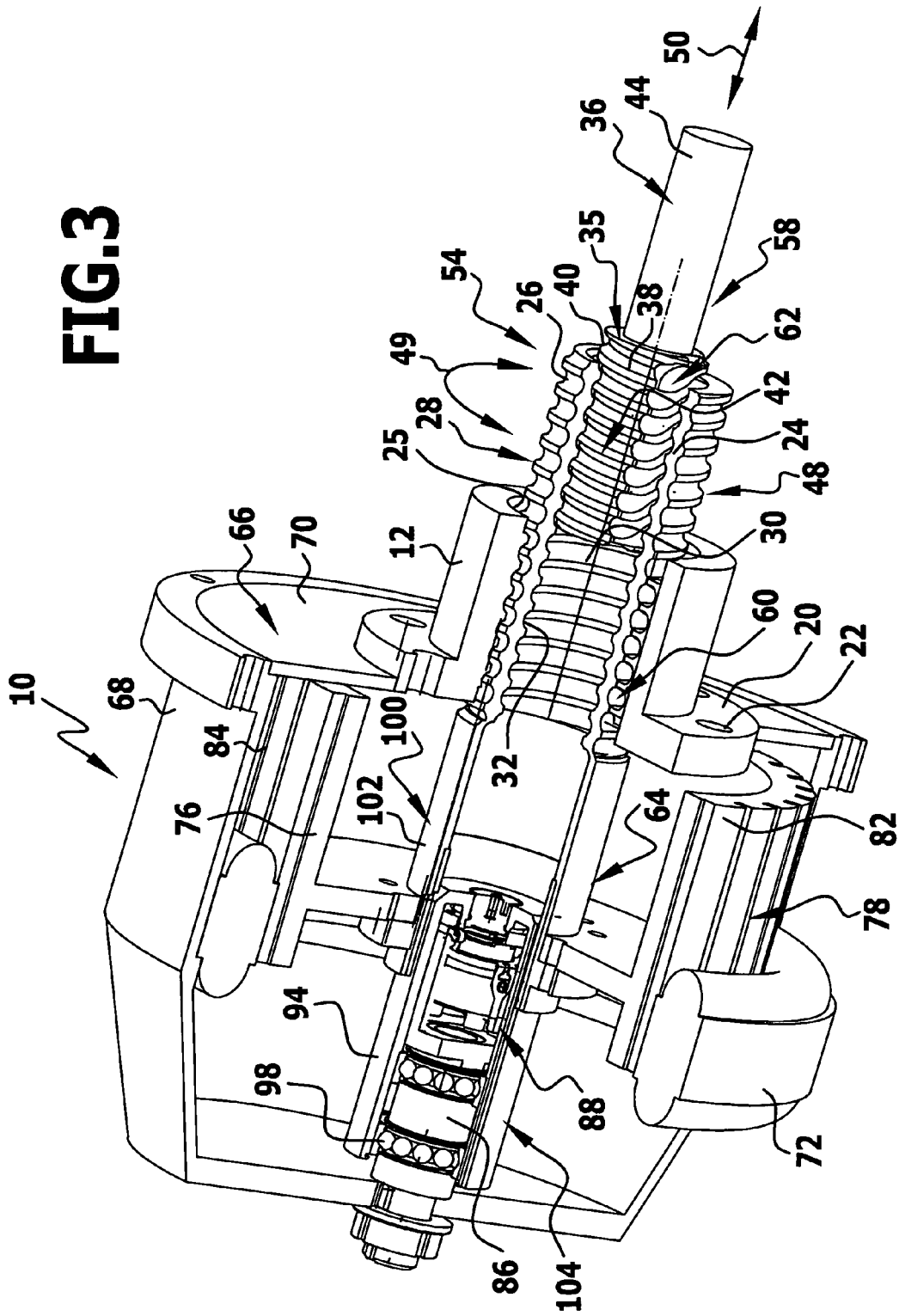

BALL SCREW AND METHOD FOR DISPLACING A THREADED SPINDLE IN A BALL SCREW

This application is a continuation of international application number PCT/EP2006/007732 filed on Aug. 4, 2006.

The present disclosure relates to the subject matter disclosed in international application number PCT/EP2006/007732 of Aug. 4, 2006 and German application number 10 2005 040 204.6 of Aug. 19, 2005, which are incorporated herein by reference in their entirety and for all purposes.

BACKGROUND OF THE INVENTION

The invention relates to a ball screw, comprising a threaded nut with thread channels for rolling bodies, a threaded spindle with thread channels for rolling bodies, and an intermediate bush, which is arranged between the threaded nut and the threaded spindle, wherein the intermediate bush has thread channels, which face the threaded nut and are adapted to the thread channels of the threaded nut, and rolling bodies are guided in theses thread channels, and wherein the intermediate bush has thread channels, which face the threaded spindle and are adapted to its thread channels, and rolling bodies are guided in these thread channels.

The invention also relates to a method for displacing a threaded spindle in a ball screw, in which an intermediate bush is driven with a rotary movement, the intermediate bush being rotatably mounted in a threaded nut by means of rolling bodies and thread channels and the threaded spindle being rotatably mounted in the intermediate bush by means of rolling bodies and thread channels.

Ball screws are used in various applications. Embodiments of ball screws are described, for example, in the book "Kugelgewindetriebe und Linearfuhrüngen" by J. Ackermann, Verlag Moderne Industrie, 1991.

A ball screw with a threaded spindle and a threaded nut, each having thread channels adapted to one another, in which rolling bodies are guided, is known from EP 1 350 988 A1. One or more return channels for returning rolling bodies with a substantially axial return direction are provided, a return element being provided for deflection from a thread channel into a return channel or vice versa.

A mechanism for actuating a vehicle brake with a central threaded spindle is known from DE 197 05 106 A1. The threaded spindle is secured in a stationary housing against rotation and is arranged so as to be axially displaceable toward a brake disc of the vehicle brake and away therefrom. The device comprises a spindle nut surrounding the spindle together with rolling bodies, said spindle nut being coupled at the end face to the rotatable rotor of an electric motor. The spindle nut is surrounded by a further nut and rotatably mounted therein by means of rolling bodies, said further nut being axially held in the stationary housing as the outer nut.

EP 0 151 788 discloses a ball screw with a piston which is arranged so as to be displaceable back and forth inside a body with a torque-transmitting first ball path.

SUMMARY OF THE INVENTION

In accordance with the present invention, a ball screw is provided, which has a large threaded spindle travel with a compact design.

In accordance with an embodiment of the invention, a first threaded arrangement which is formed by means of the thread channels of the threaded nut and the intermediate bush facing one another, and a second threaded arrangement which is formed by means of the thread channels of the intermediate bush and the threaded spindle facing one another, operate in opposite directions.

In a ball screw of this type, the threaded spindle is rotatably mounted in the intermediate bush by means of rolling bodies which roll and the intermediate bush is rotatably mounted in the threaded nut by means of rolling bodies which roll. This produces a type of telescopic mounting for the threaded spindle. A rotational movement of the intermediate bush can be converted with a corresponding thread configuration into a pure linear movement of the threaded spindle.

With a compact design, large travel paths for the threaded spindle can be achieved as the threaded spindle can carry out a travel movement in the intermediate bush and the intermediate bush can carry out a travel movement in the threaded nut.

Large forces may also be transmitted as an optimised introduction of torque into the intermediate bush is possible, for example.

No mounting for the threaded spindle needs to be provided on an application device as the threaded spindle carries out a pure stroke movement, i.e. it is sufficient to secure the threaded spindle to the application device.

A first threaded arrangement which is formed by means of the thread channels of the threaded nut and the intermediate bush facing one another, and a second threaded arrangement, which is formed by means of the thread channels of the intermediate bush and the threaded spindle facing one another, operate in opposite directions. One threaded device has a left-handed thread and the other threaded device has a right-handed thread. A pure linear movement of the threaded spindle can thus be implemented during a rotation of the intermediate bush.

In particular, the threaded spindle is displaceable in a translatory non-rotatable manner relative to the threaded nut. This produces a simple structure. The threaded spindle can also be easily coupled to an application device.

The intermediate bush is also advantageously rotatable relative to the threaded nut. The corresponding rotational movement can be driven by a motor, for example, and converted into a linear movement of the threaded spindle with a correspondingly high threaded spindle travel.

In particular, the intermediate bush can be displaced in a translatory manner relative to the threaded nut. This achieves a type of telescopic guide with correspondingly large travel lengths for the threaded spindle.

The threaded spindle can advantageously be rotated relative to the intermediate bush. A pure linear mobility of the threaded spindle relative to the threaded nut can be achieved owing to the rotatability of the intermediate bush in the threaded nut by means of the rotatability of the threaded spindle relative to the intermediate bush (which with respect to the direction of rotation works in the opposite direction to the rotation of the intermediate bush in the threaded nut).

It is favourable if a rolling body return device is arranged on the threaded nut. This allows rolling bodies rolling in the thread channels to be returned from an end point to a starting point. The arrangement on the threaded nut allows the intermediate bush to be configured with small wall thicknesses. This in turn produces a compact design of the ball screw.

For the same reason, it is favourable if a rolling bearing return device is arranged on the threaded spindle. This allows the intermediate bush to be configured in a simple manner.

A rolling body return device may be formed by a return tube system or return piece system. With a return tube system, rolling bodies are returned by way of one or more tubes from an end point to a starting point. With a deflection piece system, which has return pieces or return strips, rolling bodies as they roll traverse less than one thread turn before they are returned from an end point to a starting point. A return piece system can be configured with small radial dimensions.

It may be provided that the threaded spindle has a threaded region and a non-threaded region which extends to the front. In particular, a push rod is formed by the non-threaded region. This allows the production costs to be reduced as a threaded region only has to be provided where there is an engagement with the intermediate bush.

The non-threaded region has a smaller diameter than the threaded region, in particular. As a result, the non-threaded region of the threaded spindle can be inserted in the intermediate bush without mechanical contact.

In particular, the maximum travel of the threaded spindle is determined by the sum of the travel of the intermediate bush at the threaded nut and the travel of the threaded spindle at the intermediate bush. This produces a large threaded spindle travel with a compact design of the ball screw.

In one embodiment it is provided that the intermediate bush is driven in a rotatory manner. This rotary movement may be converted into a translatory movement of the threaded spindle, the threaded spindle being displaceable in a translatory manner without rotation relative to the threaded nut.

It may be provided here that the intermediate bush is a rotor or part of a rotor of a motor and in particular of an electric motor. This allows the intermediate bush to be driven directly. This in turn produces a high force transmission with minimised wear.

It is quite particularly advantageous if a motor is provided, to which the intermediate bush is in particular directly coupled. This allows a more compactly driven ball screw to be provided.

The intermediate bush is, in particular, a motor shaft or part of a motor shaft.

It is quite particularly advantageous if the motor is an electric motor. This allows the intermediate bush to be driven with minimised wear. A compact design is produced. For example, the electric motor is a synchronous motor with a permanent magnet device on a rotor.

In particular, a fixed part of the motor is rigidly arranged with respect to the threaded nut. The fixed part is, in particular, an electromagnetic stator device.

It is favourable if the threaded nut is arranged on a housing having the motor. This produces a compact structure for a ball screw with integrated drive.

It is advantageous if a stator device is arranged in the housing. This allows an electric motor for driving the intermediate bush to be configured in a simple manner.

A magnet device and, in particular, a permanent magnet device is advantageously relatively non-rotatably connected to the intermediate bush. The electric coupling between a stator device and the magnet device allows the intermediate bush to be set into a rotational movement, the direction of the rotation, the rotational angle and the angular speed being controllable.

In a preferred embodiment, the magnet device has a plurality of (permanent) magnets, which are arranged about an axis of the intermediate bush. This produces a high force transmission possibility with a simple structure of the ball screw.

The magnets are configured, in particular, as strips. The strips are preferably produced here from a permanent magnetic material with high remanence. They can be secured in a simple manner to a corresponding holder connected to the intermediate bush so as to be resistant to rotation, for example by adhesion.

It is favourable in this context if the magnets have a flat configuration.

It is favourable if the magnets are arranged on a holder which is relatively non-rotatably connected to the intermediate bush. By providing a holder, which is non-rotatably connected to the intermediate bush, the magnets may be arranged, for example, at a greater radial distance from the axis of the intermediate bush. This allows a large torque to be transmitted to the intermediate bush.

The magnet device is, in particular, displaceable relative to the stator device by means of the displaceability of the intermediate bush. It is advantageous if the magnet device has an axial length which is greater than the axial length of a stator device, so at each position and, in particular displacement position, of the intermediate bush, there is an electromagnetic coupling between the stator device and the magnet device. The axial length of the magnet device is determined by the displacement travel of the intermediate bush. This displacement travel of the intermediate bush is, however, smaller than the maximally possible displacement travel of the threaded spindle, so a compact structure is produced.

It is favourable if an angle sensor is provided. The angle sensor allows the angular position of the intermediate bush to be determined at every instant. An electric motor, such as, for example, a torque electric motor can be correspondingly activated thereby. The linear position of the threaded spindle can also then be determined at every instant.

In particular, the angle sensor is connected to a motor controller. A current loading of a stator device can then be controlled as a function of the angular position determined of the intermediate bush to obtain a defined movement of the intermediate bush.

In particular, the angle sensor has a first device, which is arranged so as to be non-rotatable relative to the threaded nut, and has a second device which can be rotated with the intermediate bush. The angular position of the intermediate bush relative to the threaded nut can then be detected.

The second device is, in particular, coupled to a sliding region of the intermediate bush. The provision of the sliding region allows the bearing stability of the intermediate bush at the ball thread region to be improved. The angular position of the intermediate bush can be easily detected owing to the coupling of the second device to the sliding region of the intermediate bush.

The second device is, in particular, coupled to a shaft, which is rotatably mounted and on which the intermediate bush is displaceably mounted. The mounting face for the intermediate bush can thereby be increased.

The shaft is, in particular, coupled to the intermediate bush in such a way that it is driven by the rotary movement of the intermediate bush in a synchronous rotary movement. For example, the shaft is configured as a hollow shaft, in the cavity of which at least a part of an angle sensor is arranged. The shaft allows both a sliding mounting and also a rotary mounting of the intermediate bush to be provided and the angular position of the intermediate bush to be determined here by means of an angle sensor.

In accordance with the present invention, a method for displacing a threaded spindle in a ball screw is provided, by means of which a high threaded spindle travel can be achieved with a compact design.

In accordance with an embodiment of the invention, the threaded spindle is set into a rotary movement with a direction of rotation opposite to the rotation of the intermediate bush on the threaded nut, the intermediate bush and the threaded spindle being displaced in the same linear direction.

The method according to the invention has the advantages already described in conjunction with the ball screw according to the invention.

Further advantageous configurations have also already been described in conjunction with the ball screw according to the invention.

The intermediate bush is driven by an electric motor, in particular. This allows a direct transmission of torque to the intermediate bush to be easily achieved, it being possible to transmit high forces. A compact structure of the corresponding ball screw is produced.

It is favourable if the angular position of the intermediate bush is determined by an angle sensor. The angular position of the intermediate bush and also its angular speed and its direction of rotation are thus known at any instant. Control of the electric motor and, in particular, the current loading of a stator device can thus in turn be implemented in a simple manner.

The drive of the intermediate bush is controlled, in particular, by means the angular positions determined by the angle sensor. This allows a positioning of the threaded spindle in its displacement direction to be achieved with a high degree of precision.

The following description of preferred embodiments is used to describe the invention in more detail in conjunction with the drawings.

BRIEF DESCRIPTION OF THE DRAWINGS

FIG. 3 shows a partially perspective sectional view of the ball screw according to FIG. 1 with the threaded spindle retracted.

DETAILED DESCRIPTION OF THE INVENTION

Figure 1:
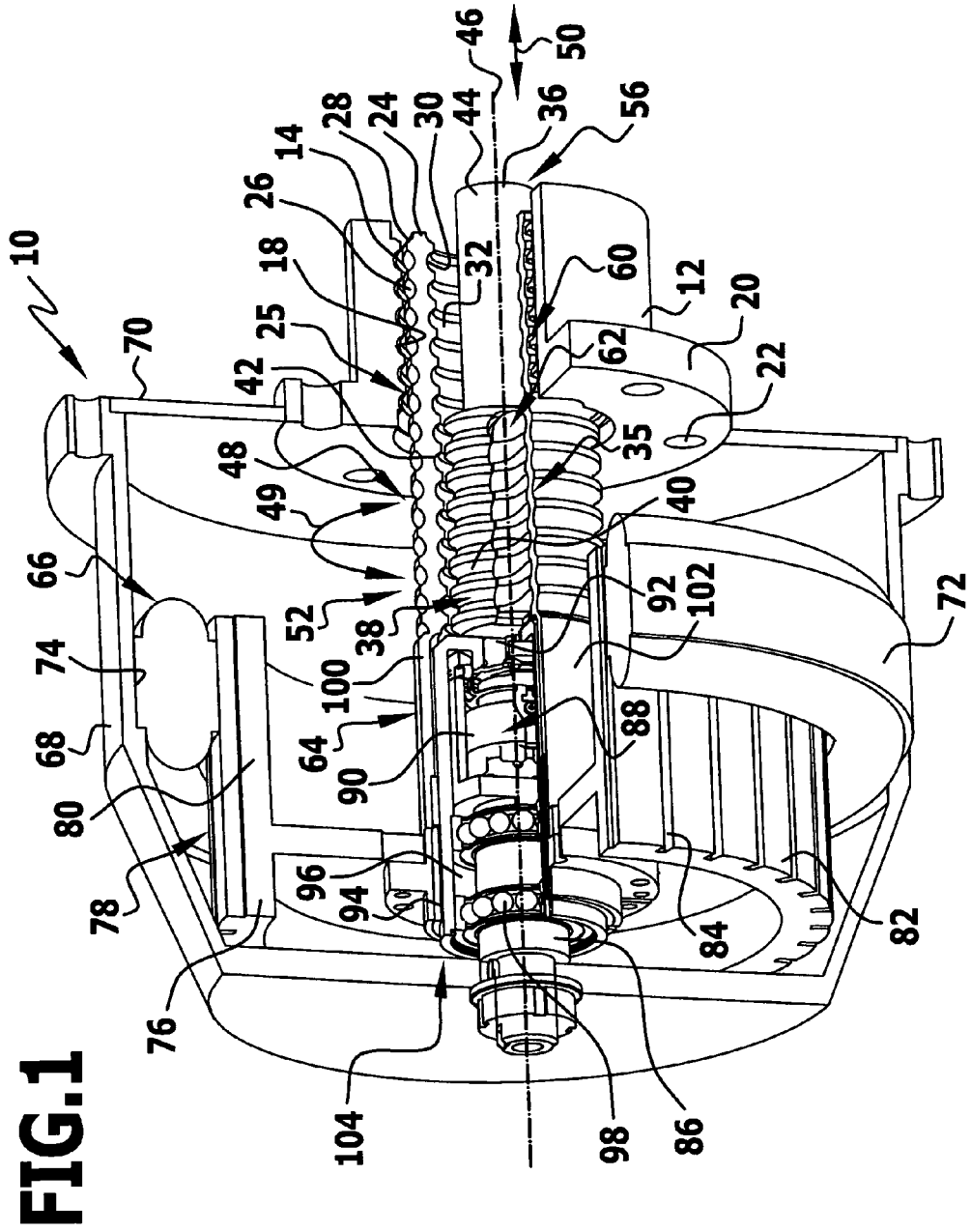
FIG. 1 shows a partially perspective sectional view of an embodiment of a ball screw according to the invention with an inserted threaded spindle (rolling bodies are not shown)
Figure 2:
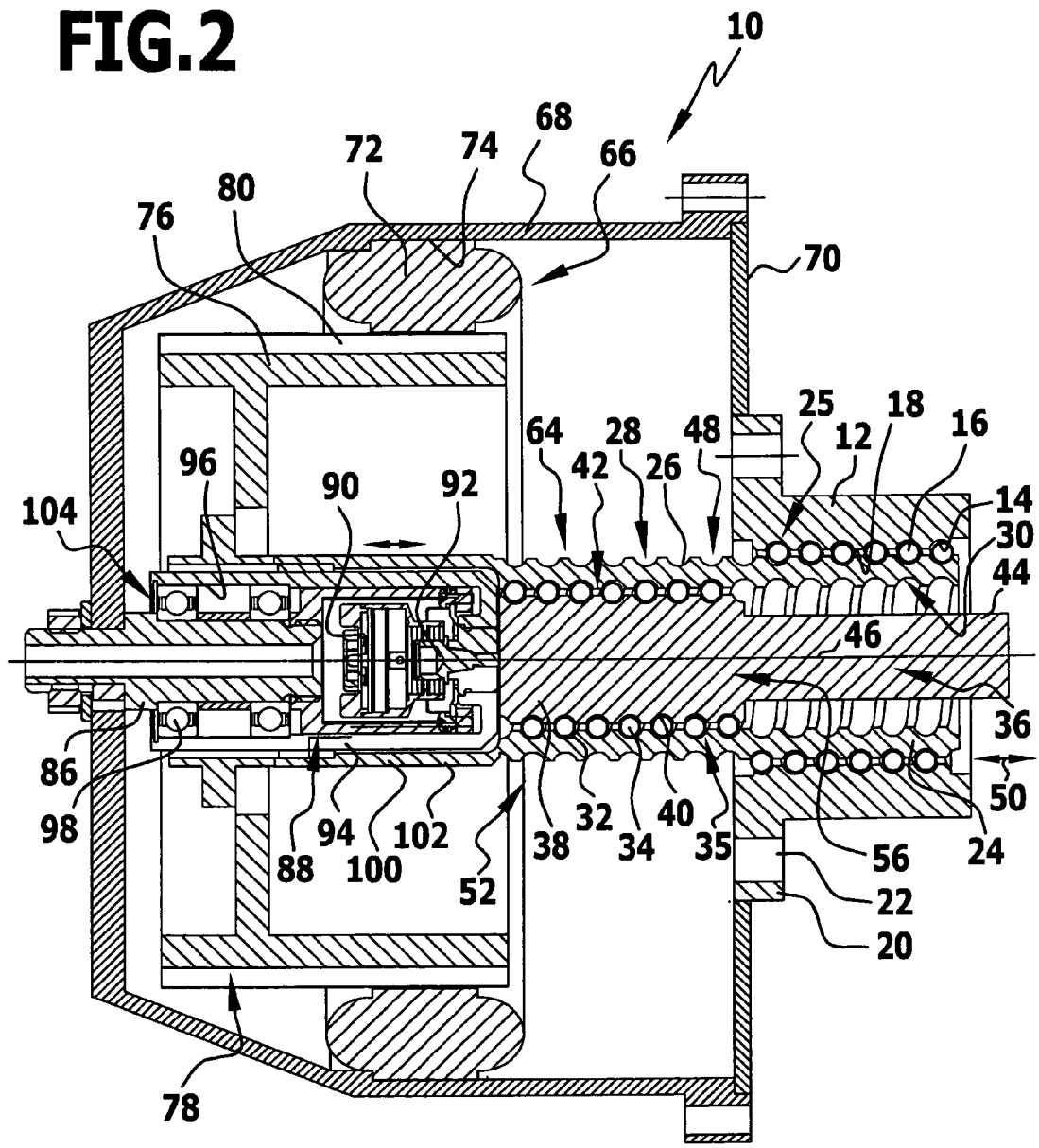
FIG. 2 shows a sectional view of the ball screw according to FIG. 1.

An embodiment of a ball screw according to the invention, which is schematically shown in FIGS. 1 to 3 and designated 10 there, comprises a threaded nut 12 with thread channels 14 for guiding rolling bodies 16 (FIG. 2). The rolling bodies 16 are, in particular, rolling balls.

The thread channels 14 of the threaded nut 12 are on an inside 18 of the threaded nut 12.

The threaded nut 12 has an annular flange 20, which is provided with fastening recesses 22.

An intermediate bush 24 is guided in the threaded nut 12. Said intermediate bush has thread channels 26, which face the threaded nut 12. The thread channels 26 are adapted to the thread channels 14 of the threaded nut 12 and arranged on the outside 28 of the intermediate bush 24. Thread paths for the rolling bodies 16, in which the rolling bodies 16 are guided, are formed by the thread channels 14 and 26. A first threaded device 25 is thus formed, on which the rolling bodies 16 can roll.

The intermediate bush 24 is hollow cylindrical. Thread channels 32 are also formed on an inside 30, which opposes the outside 28. Rolling bodies 34 (FIG. 2), in particular rolling balls, are guided in these thread channels 32.

A threaded spindle 36 is arranged in the intermediate bush 24. Said threaded spindle comprises a threaded region 38 with thread channels 40, which face the inside 30 of the intermediate bush 24. The thread channels 40 are arranged on an outside 42 of the threaded region 38 of the threaded spindle 36. They are adapted to the thread channels 32 on the inside 30 of the intermediate bush 24. Thread paths, in which the rolling bodies 34 are guided are formed by the thread channels 32 and 40. A second threaded device 35 is thus formed, on which the rolling bodies 34 can roll.

The first threaded device 25 and the second threaded device 35 are formed to operate in opposite directions to one another as left-handed/right-handed threaded devices.

The threaded spindle 36 comprises a non-threaded region 44 which has a smaller diameter in relation to an axis 46 of the threaded spindle 36. The threaded spindle 36 is smooth, for example, in the non-threaded region 44. The threaded spindle 36 projects with its non-threaded region 44 to the front. A push rod is formed, in particular, by means of the non-threaded region 44 of the threaded spindle 36.

The axis 46 is an axis of rotation of the intermediate bush 24. This comprises a threaded region 48 which bears the thread channels 26 on its outside 28 and the thread channels 32 on its inside 30. The axial length of the threaded region 48 (along the axis 46) determines the possible travel of the intermediate bush 24 in relation to the threaded nut 12.

The intermediate bush 24 can be rotated relative to the threaded nut 12. It is driven in a rotatory manner to carry out the corresponding rotary movement. The rotatability of the intermediate bush 24 is indicated in FIGS. 1 and 3 by the arrow with the reference numeral 49. The intermediate bush 24 can also be displaced in a linear direction 50 by rotating the intermediate bush 24.

FIG. 1 shows a first position 52 of the intermediate bush 24, in which it is in its minimal travel position. In this minimal travel position, the intermediate bush 24 projects to the furthest extent over the threaded nut 12 in a direction opposing the non-threaded region 44 of the threaded spindle 36.

FIG. 3 shows a second position 54 of the intermediate bush 24, which is in a maximal travel position in relation to the first position 52. In this second position 54, the intermediate bush 24 projects to the greatest extent over the threaded nut 12 in the direction of the non-threaded region 44 of the threaded spindle 36.

The threaded spindle 36 is rotatably mounted in the intermediate bush 24 by its threaded region 38 with an axis of rotation coaxial to the axis 46. The direction of rotation is in the opposite direction here to the direction of rotation of the intermediate bush 24 in the threaded nut 12. The threaded spindle 24 is mounted in a translatory manner in the linear direction 50 and so as to be resistant to rotation relative to the threaded nut 12. On rotation of the intermediate bush 24, the threaded spindle 36 is moved in the linear direction 50, the travel of the threaded spindle 36 relative to the threaded nut 12, because of the rotary mounting of the threaded spindle 36 in the intermediate bush 24, being greater than the travel of the intermediate bush 24, relative to the threaded nut 12; the travel of the threaded spindle 36 is composed of the travel of the intermediate bush 24 on the threaded nut 12 and the travel of the threaded spindle 36 in the intermediate bush 24, it being possible to impose a pure linear movement in the linear direction 50 on the threaded spindle 36.

FIG. 1 shows a first position 56 ("inserted position") of the threaded spindle 36, in which the latter is maximally inserted into the intermediate bush 24.

FIG. 3 shows a second position 58 ("retracted position") of the threaded spindle 36, in which the latter is minimally inserted into the intermediate bush 24. The difference in distance in the linear direction 50 between the second position 58 and the first position 56 defines the maximum travel of the threaded spindle 36.

To return the rolling bodies 16, a rolling body return device 60 is arranged on the threaded nut 12. This may, for example, be a return tube system, in which rolling bodies 16 can be returned from an end point to a starting point by way of deflection tubes, which are arranged on or in the threaded nut 12, and can thereby be used again for load transmission. It is also possible for the rolling body return device 60 to be configured as a return piece system, for example, in which the rolling bodies 16 which roll on the thread channels 14 and 26 are returned from an end point to a starting point after slightly less than one thread turn by a return piece or a return strip.

The threaded spindle 36 also has a rolling body return device 62. For space reasons, the latter is preferably configured as a return piece system, in which an internal rolling body return takes place on the thread channels 32, 40.

The intermediate bush 24 is preferably driven directly. It forms a shaft or a part of a shaft of a motor. In particular, the intermediate bush 24 is part of a rotor 64 of an electric motor 66, such as, for example, a torque electric motor. In particular, the electric motor 66 is a synchronous motor.

The electric motor 66 is received in a housing 68. The threaded nut 12 is seated on an end face 70 of the housing 68.

Arranged in the housing 68 is a stator device 72, which comprises one or more stator coils. The corresponding coil windings surround the axis 46. The stator device 72 is seated, for example, on an inside 74 of the housing 68.

The housing 68, at least in the region of the stator device 72, has an internal diameter, which is greater than the external diameter of the intermediate bush 24. Accordingly, the diameter of the stator device 72 is larger than the diameter of the intermediate bush 24 (in relation to the axis 46).

A holder 76 for a magnet device 78 is non-rotatably connected to the intermediate bush 24. The holder 76 in this case has a holding region 80, which is radially spaced apart from the threaded region 48 of the intermediate bush 24. The magnet device 78 opposes the stator device 72 with a small spacing (to avoid touching).

The magnet device 78 comprises a plurality of magnetic strips 82 made of a permanent magnet material. The magnetic strips 82 have a flat configuration, in particular. They may have a shape, such as, for example, a curvature, adapted to the holding region 80. They are arranged on the holding region 80 distributed uniformly about the axis 46. In particular, they are adhered on. An air gap 84 is located between adjacent magnetic strips 82.

The magnet device 78 has a length in the axial direction (parallel to the axis 46), which is greater than the corresponding axial length of the stator device 72. The axial length of the magnetic strips 82 is selected such that both in the first position 52 (FIG. 1) and in the second position 54 (FIG. 3) of the intermediate bush 24, an electromagnetic coupling is present between the stator device 72 and the magnet device 78.

A bearing pin 86 (bearing mandrel) is non-rotatably secured on the housing 68, centrally with respect to the axis 46. The bearing pin 86 holds an angle sensor 88 (rotation sensor), which can determine the angular position (rotary position) of the intermediate bush 24. With a known angular position of the intermediate bush 24, the linear position of the threaded spindle 36 is also known. The electric motor 66 can be activated using data supplied by the angle sensor 88; in particular, the current loading of the stator device 72 is controlled using data supplied by the angle sensor 88 to adjust or control defined travel positions/travel speeds of the threaded spindle 36.

The angle sensor 88 is a contactless angle sensor, in particular, such as, for example, an inductive angle sensor, a capacitive angle sensor or an optical angle sensor. It may be a multi-turn resolver which can also resolve angles of rotation greater than 360°.

The angle sensor 88 comprises a first device 90, which is non-rotatable relative to the threaded nut 12. The first device 90 is seated, in particular, non-rotatably on the bearing pin 86.

The angle sensor 88 also comprises a second device 92 which can be rotated synchronously with the intermediate bush 24.

In the embodiment shown, the second device 92 is coupled to a shaft 94, which is rotatably mounted about the axis 46 in the housing 28. The shaft 94 is, in particular, configured as a hollow shaft, the first device 90 (and optionally the second device 92) of the angle sensor 88 being arranged in an interior 96.

On the bearing pin 86, one or more radial bearings 98, such as, for example, roller bearings, are seated for the rotational mounting of the shaft 94 on the bearing pin 86.

The intermediate bush 24 has a sliding region 100, which is configured, in particular, as a sliding bush 102. The intermediate bush 24 is displaceably guided on the shaft 94 by means of this sliding region 100, the intermediate bush 24 being coupled to the shaft 94 by way of one or more entrainment means in such a way that a driven rotational movement of the intermediate bush 24 brings about a synchronous rotation of the shaft 94; this in turn brings about a rotation of the second device 92 relative to the first device 90 of the angle sensor 88.

A rotating-sliding bearing device 104 for the intermediate bush 24 is formed by the shaft 94 with its rotary mounting by way of the radial bearing(s) 98 and the sliding bush 102 of the intermediate bush 24 with its sliding guidance on the shaft 94. Owing to this rotating/sliding bearing device 104, the intermediate bush 24 is rotatably and displaceably mounted in the housing 68 in the region of an end remote from the threaded nut 12, it being possible to transmit the rotary movement of the intermediate bush 24 to the shaft 94 to in turn bring about a rotation of the second device 92 relative to the first device 90 of the angle sensor 88.

The ball screw 10 according to the invention functions as follows:

The rotor 64 is driven with a rotary movement because of the magnetic coupling to the magnet device 78 by means of loading the stator device 72 of the electric motor 66 with current. The current loading determines the direction of rotation here. This rotational movement brings about a rotary movement of the intermediate bush 24 in the threaded nut 12.

The intermediate bush 24 rotates relative to the threaded nut 12, the intermediate bush 24 being mounted on the threaded nut 12 by rolling bodies which roll in the thread channels 14, 26. An axial displacement of the intermediate bush 24 in the linear direction 50 is also brought about by the rotary movement.

The threaded spindle 36 is also set into a rotary movement relative to the intermediate bush 24 in the opposite direction of rotation to the rotation of the intermediate bush 24 on the threaded nut 12 owing to the driven rotary movement of the intermediate bush 24, the threaded spindle 36 being rotationally fixed relative to the threaded nut 12 (in particular if the threaded spindle 36 is secured at one end on an application device).

The threaded spindle 36 is mounted in the intermediate bush 24 by way of the rolling bodies 34 which roll in the thread channels 32, 40 of the threaded device 35. This produces a type of telescopic guidance for the threaded spindle 36; owing to the telescopic guidance, the threaded spindle 36 can be displaced in a purely translatory manner in the linear direction 50. A large travel path with a compact design is produced, in other words with a small axial overall length of the ball screw 10. Furthermore, large forces can be achieved.

The coupling of the intermediate bush 24 to the rotating/sliding bearing device 104 produces an enlarged bearing face. The rotational position (angular position) of the intermediate bush 24 and, from this, the linear position of the threaded spindle 36, can be determined with a high degree of precision at any instant, in turn making possible an activation of the intermediate bush 24 to adjust a defined position of the threaded spindle 36.

A high torque can be transmitted to the intermediate bush 24 by the electric motor 66, a compact structure being achieved by the provision of flat magnetic strips 82.

The invention claimed is:

1. Ball screw, comprising:
a threaded nut with thread channels for rolling bodies;
a threaded spindle with thread channels for rolling bodies;
an intermediate bush, which is arranged between the threaded nut and the threaded spindle;
the intermediate bush is rotatable relative to the threaded nut and is displaceable in a translatory manner relative to the threaded nut;
wherein the intermediate bush has thread channels, which face the threaded nut and are adapted to the thread channels of the threaded nut, and rolling bodies are guided in these thread channels; and
wherein the intermediate bush has thread channels, which face the threaded spindle and are adapted to the thread channels of the threaded spindle, and rolling bodies are guided in these thread channels;
a first threaded arrangement, which is formed by means of the thread channels of the threaded nut and the intermediate bush facing one another;
a second threaded arrangement, which is formed by means of the thread channels of the intermediate bush and the threaded spindle facing one another;
wherein the first threaded arrangement and the second threaded arrangement operate in opposite directions; and
a magnet device which is relatively non-rotatably connected to the intermediate bush;
wherein the magnet device displaces in a translational manner in a linear axial direction relative to a stator device by means of the translational displaceability of the intermediate bush in that direction and wherein the intermediate bush is a part of a rotor of a motor.

2. Ball screw according to claim 1, wherein the threaded spindle is displaceable in a translatory non-rotatable manner relative to the threaded nut.

3. Ball screw according to claim 1, wherein the threaded spindle is rotatable relative to the intermediate bush.

4. Ball screw according to claim 1, wherein a rolling body return device is arranged on the threaded nut.

5. Ball screw according to claim 4, wherein a rolling body return device is formed by a return duct system or return piece system.

6. Ball screw according to claim 1, wherein a rolling body return device is arranged on the threaded spindle.

7. Ball screw according to claim 1, wherein the threaded spindle has a threaded region and a non-threaded region which extends to a front.

8. Ball screw according to claim 7, wherein the non-threaded region has a smaller diameter than the threaded region.

9. Ball screw according to claim 1, wherein the maximal travel of the threaded spindle is determined by the sum of the travel of the intermediate bush on the threaded nut and the travel of the threaded spindle on the intermediate bush.

10. Ball screw according to claim 1, wherein the intermediate bush has a threaded region and a sliding region.

11. Ball screw according to claim 10, wherein the sliding region is mounted on a rotating-sliding bearing device.

12. Ball screw according to claim 10, wherein the sliding region is formed by a sliding bushing.

13. Ball screw according to claim 1, wherein the intermediate bush is driven in a rotary manner.

14. Ball screw according to claim 1, wherein the intermediate bush is a motor shaft or part of a motor rotor shaft.

15. Ball screw according to claim 1, wherein the motor is an electric motor.

16. Ball screw according to claim 1, wherein a fixed part of the motor is fixedly arranged with respect to the threaded nut.

17. Ball screw according to claim 1, wherein the threaded nut is arranged on a housing which receives the motor.

18. Ball screw according to claim 17, wherein the stator device is arranged in the housing.

19. Ball screw according to claim 18, wherein the magnet device has an axial length, which is greater than the axial length of the stator device, so that at each position of the intermediate bush, an electromagnetic coupling is present between the stator device and the magnet device.

20. Ball screw according to claim 1, wherein the magnet device has a plurality of magnets which are arranged about an axis of the intermediate bush.

21. Ball screw according to claim 20, wherein the magnets are configured as strips.

22. Ball screw according to claim 20, wherein the magnets have a flat configuration.

23. Ball screw according to claim 20, wherein the magnets are arranged on a holder which is relatively non-rotatably connected to the intermediate bush.

24. Ball screw according to claim 23, wherein the holder has a larger diameter than a threaded region of the intermediate bush.

25. Ball screw according to claim 1, wherein an angle sensor is provided.

26. Ball screw according to claim 25, wherein the angle sensor has a first device which is arranged so as to be non-rotatable relative to the threaded nut, and has a second device which is rotatable with the intermediate bush.

27. Ball screw according to claim 26, wherein the second device is coupled to a sliding region of the intermediate bush.

28. Ball screw according to claim 26, wherein the second device is coupled to a shaft which is rotatably mounted and on which the intermediate bush is displaceably mounted.

29. Ball screw according to claim 28, wherein the shaft is coupled to the intermediate bush in such a way that it is driven by the rotary movement of the intermediate bush in a synchronous rotary movement.

* * * * *

UNITED STATES PATENT AND TRADEMARK OFFICE
CERTIFICATE OF CORRECTION

PATENT NO. : 7,870,803 B2
APPLICATION NO. : 12/012277
DATED : January 18, 2011
INVENTOR(S) : Winfried Schroeppel et al.

It is certified that error appears in the above-identified patent and that said Letters Patent is hereby corrected as shown below:

Column 9, Claim 1, line 43, insert --;-- between "direction" and "and".

Column 10, Claim 14, line 17, remove "motor shaft or".

Signed and Sealed this
Twenty-second Day of March, 2011

David J. Kappos
*Director of the United States Patent and Trademark Office*